(12) United States Patent
Maack et al.

(10) Patent No.: US 11,791,067 B2
(45) Date of Patent: Oct. 17, 2023

(54) METHODS FOR BONDING STRANDED CABLE SUBUNITS TO CENTRAL MEMBER

(71) Applicant: CORNING RESEARCH & DEVELOPMENT CORPORATION, Corning, NY (US)

(72) Inventors: David Ralph Maack, Horseheads, NY (US); Lars Kristian Nielsen, Hickory, NC (US); James Arthur Register, III, Hickory, NC (US); William Taylor Rowell, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 417 days.

(21) Appl. No.: 16/990,880

(22) Filed: Aug. 11, 2020

(65) Prior Publication Data
US 2021/0065936 A1    Mar. 4, 2021

Related U.S. Application Data

(60) Provisional application No. 62/893,489, filed on Aug. 29, 2019.

(51) Int. Cl.
*H01B 13/00* (2006.01)
*H01B 13/26* (2006.01)
(Continued)

(52) U.S. Cl.
CPC ....... *H01B 13/0023* (2013.01); *G02B 6/4434* (2013.01); *G02B 6/4479* (2013.01);
(Continued)

(58) Field of Classification Search
CPC .. G02B 6/4479; G02B 6/4413; G02B 6/4416; G02B 6/4434; H01B 13/0023;
(Continued)

(56) References Cited

U.S. PATENT DOCUMENTS

| 5,268,971 | A | * | 12/1993 | Nilsson | H01B 11/22 385/103 |
| 7,259,332 | B2 | * | 8/2007 | Shuman | H01B 11/22 174/113 R |

(Continued)

FOREIGN PATENT DOCUMENTS

| CN | 107870402 A | 4/2018 |
| EP | 2977804 A1 | 1/2016 |

(Continued)

OTHER PUBLICATIONS

Khalil et al, "Heat transfer and stability characteristics of cable bundles in He I and subcooled He II," in IEEE Transactions on Magnetics, vol. 19, No. 3, pp. 268-271, May 1983. (Year: 1983).*

(Continued)

*Primary Examiner* — A. Dexter Tugbang
(74) *Attorney, Agent, or Firm* — William D. Doyle

(57) ABSTRACT

Bundled cables and methods for preparing bundled cable are disclosed herein. In the method, a plurality of subunits is wound about a central member. The subunits include a subunit jacket made of a first thermoplastic composition and has a first outer surface, and the central member includes a central member jacket made of a second thermoplastic composition and has a second outer surface. A metal element is provided at an interface of the second outer surface and the first outer surface of the subunits. The metal element is heated such that at least one of the first thermoplastic composition or the second thermoplastic composition forms bonds with the other of the first thermoplastic composition or the second thermoplastic composition.

17 Claims, 4 Drawing Sheets

(51) Int. Cl.
  *G02B 6/44* (2006.01)
  *H01B 11/22* (2006.01)
  *H01B 19/04* (2006.01)
  *H01B 9/00* (2006.01)
  *H01B 7/02* (2006.01)

(52) U.S. Cl.
  CPC ............. *H01B 9/005* (2013.01); *H01B 11/22* (2013.01); *H01B 13/0013* (2013.01); *H01B 19/04* (2013.01); *G02B 6/4413* (2013.01); *G02B 6/4416* (2013.01); *H01B 7/0258* (2013.01); *H01B 13/264* (2013.01); *H01B 13/2653* (2013.01)

(58) Field of Classification Search
  CPC .. H01B 13/264; H01B 13/2653; H01B 11/22; H01B 7/0258; H01B 13/0013; H01B 19/04; H01B 9/005
  See application file for complete search history.

(56) References Cited

U.S. PATENT DOCUMENTS

2002/0046871 A1* 4/2002 Goeblmaier ......... H01B 7/0258
                                                174/121 A
2014/0233899 A1  8/2014 Miyamoto et al.
2015/0110451 A1  4/2015 Blazer et al.
2017/0271046 A1  9/2017 Parke

FOREIGN PATENT DOCUMENTS

JP    2014093169 A  *  5/2014
WO    2018/102330 A1    6/2018

OTHER PUBLICATIONS

European Patent Application No. 20191357.1 Search Report and Search Opinion dated Feb. 3, 2021; 8 Pages; European Patent Office.

* cited by examiner

METHODS FOR BONDING STRANDED CABLE SUBUNITS TO CENTRAL MEMBER

CROSS-REFERENCED TO RELATED APPLICATIONS

This application claims the benefit of priority under 35 U.S.C. § 119 of U.S. Provisional Application Ser. No. 62/893,489 filed on Aug. 29, 2019, the content of which is relied upon and incorporated herein by reference in its entirety.

BACKGROUND

The disclosure relates generally to optical fiber cables and more particularly to optical fiber cables that have drop cables that run along at least a portion of the length of a main distribution cable. Optical fiber cables are used to transmit data over distance. Generally, large distribution cables that carry a multitude of optical fibers from a hub are sub-divided at network nodes, which are further sub-divided, e.g., to the premises of individual subscribers. Generally, these subdivisions involve splicing a cable tether into a main distribution line. Cable splicing at specific locations along a main distribution line is a delicate and time consuming process that requires precise placement of the cable tether and that involves the risks of cutting the wrong fibers and providing environmental exposure to the cable interior.

SUMMARY

In one aspect, embodiments of the disclosure relate to a method of preparing a bundled cable are disclosed herein. In the method, a plurality of subunits is wound around a central member. Each of the plurality of subunits includes a subunit jacket made of a first thermoplastic composition and has a first outer surface, and the central member includes a central member jacket made of a second thermoplastic composition and has a second outer surface. Further, in the method, a metal element is provided at an interface of the second outer surface and each first outer surface of the plurality of subunits. The metal element is then heated such that at least one of the first thermoplastic composition or the second thermoplastic composition forms bonds with the other of the first thermoplastic composition or the second thermoplastic composition.

In another aspect, embodiments of the disclosure relates to a method of preparing a bundled cable. In the method, a hot melt adhesive is applied to a central member. A plurality of subunits is wound around the central member. Each of the plurality of subunits includes a subunit jacket having a first outer surface. The central member includes a central member jacket having a second outer surface. The hot melt adhesive forms a plurality of bonds between the plurality of subunits and the central member.

In still another aspect, embodiments of the disclosure relates to a bundled cable. The bundled cable includes a central member including a central member jacket having a first outer surface. The bundled cable also includes a plurality of subunits wound around the central member. Each of the plurality of subunits includes a subunit jacket having a second outer surface. Further, the bundled cable includes a metal element disposed at one or more thermally bonded interfaces of the first outer surface and each of the second outer surfaces. The second outer surfaces of the plurality of subunits are an outermost surface of the bundled cable.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of a method of bonding subunit strands to central member are provided. As will be discussed more fully below, the subunit strands may carry optical fibers and/or power transmission wires and the central member may be an optical fiber cable, a central strength member, or a power transmission cable. In embodiments, the subunits are bonded to the central member at various locations along the length of the central member to hold the subunits around the central member until a separation location is reached. The bonding is provided because, unlike other conventional cables, the subunits are not contained within an outer cable jacket. That is, the subunits form the outermost surface of the bundled cable. In embodiments, the subunits may be bonded to the central member by welding the subunits to the central member, such as through induction welding, and in other embodiments, the subunits are adhered to the central member, e.g., using a hot melt. In still other embodiments, the subunits may be provided with a thin, outer skin layer that facilitates bonding between the subunits and/or central member. Advantageously, each of these bonding methods allows for the subunit to easily be separated from the central member as necessary, e.g., when a subunit reaches a drop point and diverges from the central member. Other aspects and advantages will be described in relation to these and other embodiments provided herein and in the figures. These embodiments are presented by way of illustration and not by way of limitation.

Figure 1:
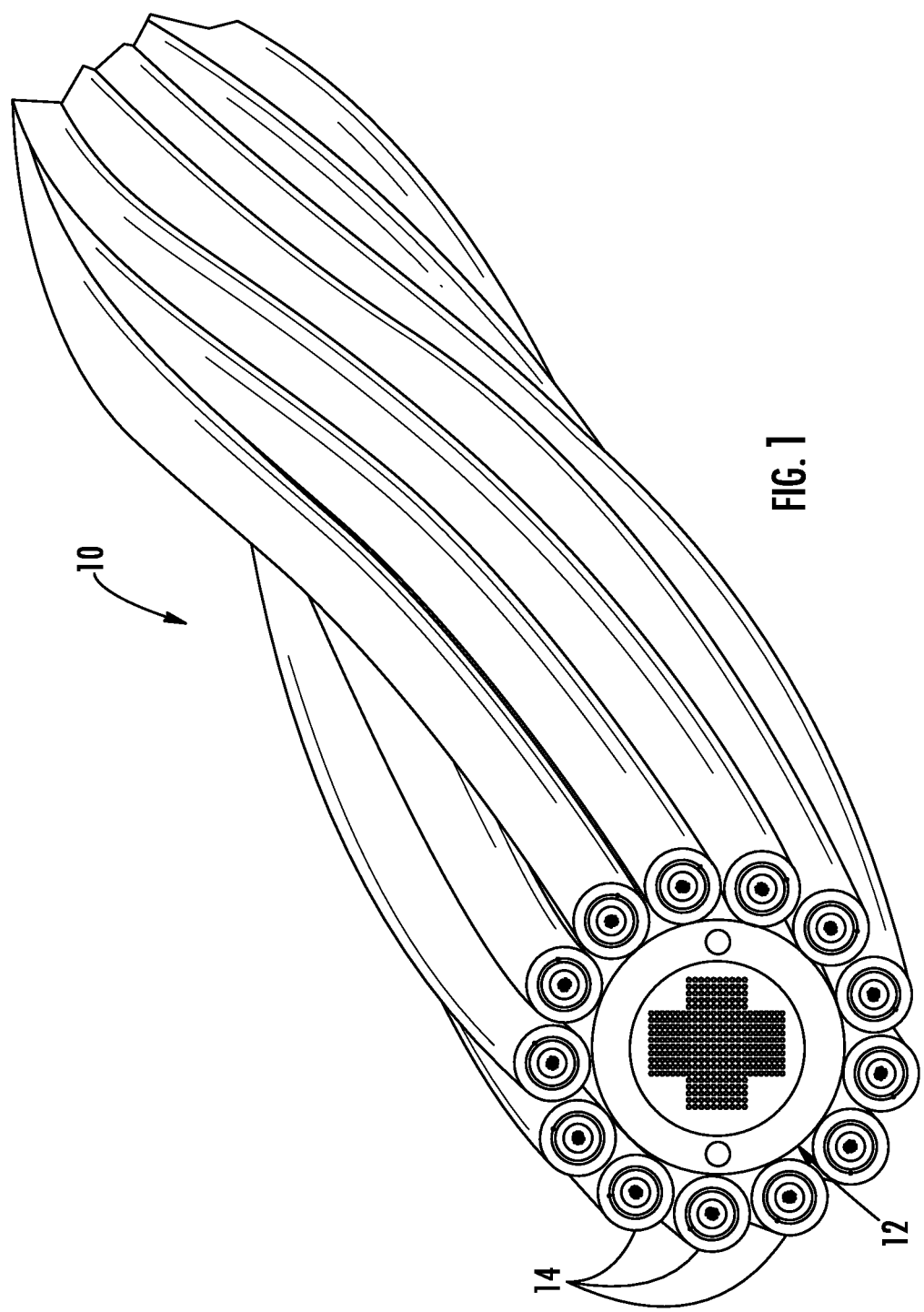
FIG. 1 depicts partial perspective view of a bundled optical cable, according to an exemplary embodiment.

FIG. 1 depicts an embodiment of a bundled optical fiber cable 10 in a partial sectional view taken over a portion of the length of the bundled optical fiber cable 10. As can be seen, the bundled optical fiber cable 10 includes a central member 12 and a plurality of subunits 14 that are wound around the outside of the central member 12. In embodiments, the subunits 14 are helically wound around the central member 12. For example, in—embodiments, the subunits 14 may have an S-winding or a Z-winding around the central member 12. Additionally, in embodiments, the subunits 14 may have an SZ winding around the central member 12. That is, the subunits 14 may have an S-winding followed by a reversal to a Z-winding, then a reversal to S-winding, etc.

Figure 2:
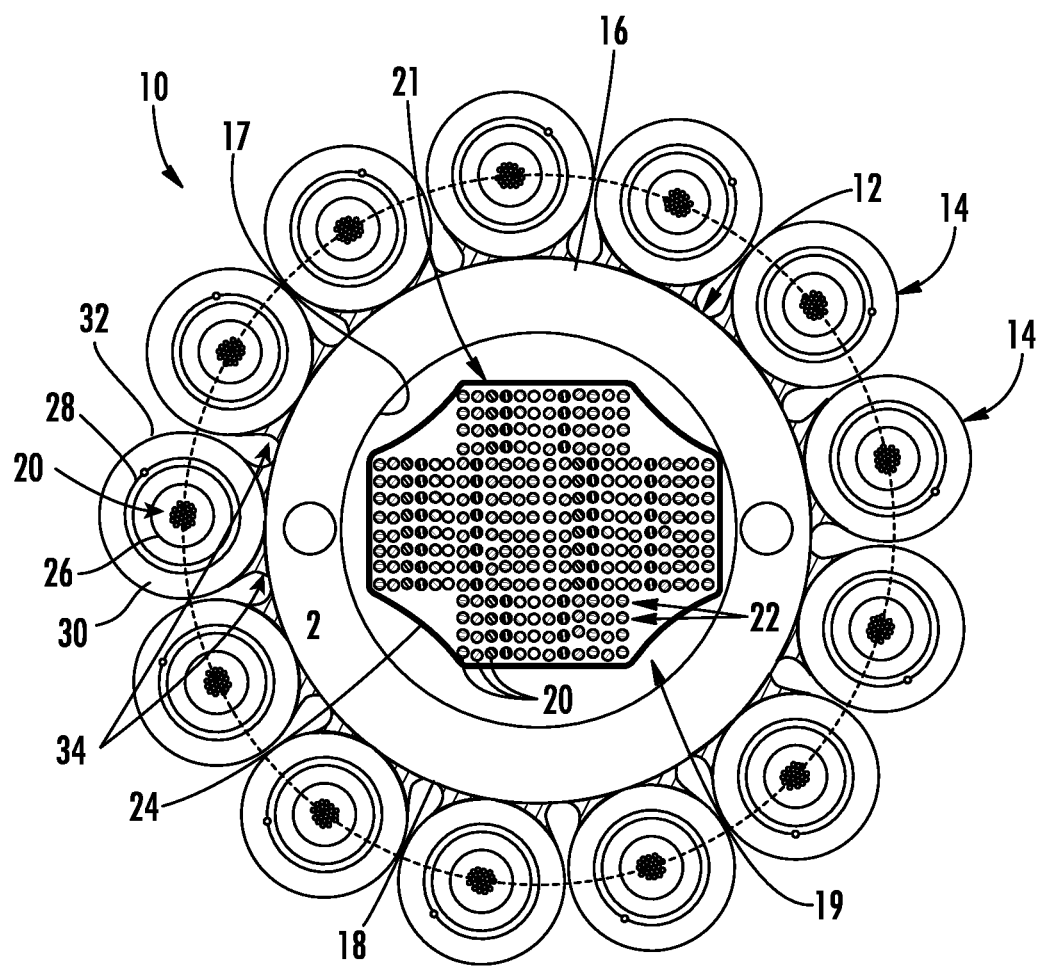
FIG. 2 depicts a cross-sectional view of the bundled optical cable of FIG. 1.
Figure 3:
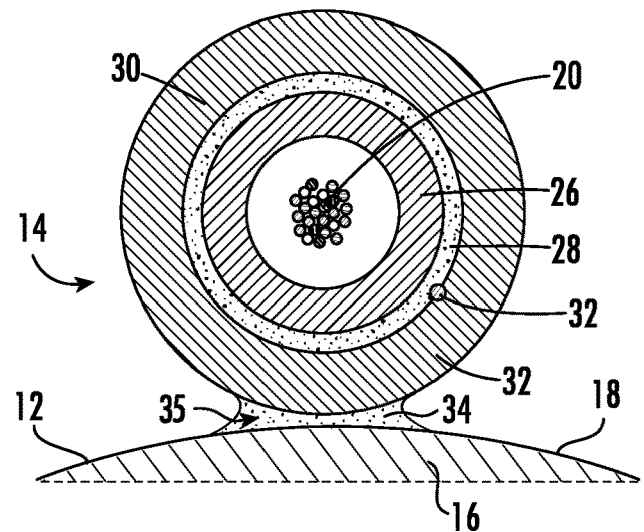
FIG. 3 depicts a detail view of a bond between a subunit and the central member, according to an exemplary embodiment.

FIG. 2 provides a detailed cross-sectional view of an embodiment of the bundled cable 10. As can be seen, the subunits 14 are substantially evenly spaced around a circumference of the central member 12. In embodiments, the central member 12 may be an optical fiber cable (as shown in FIG. 2), a power transmission cable, or a central strength member (e.g., a glass-reinforced plastic (GRP) rod jacketed with a polymeric material). As will described more fully below, the subunits 14 are bonded to the central member 12. In particular, regardless of the particular type of subunit 14 and the particular type of central member 12, the subunits 14 include a polymeric jacket that is bonded to a polymeric jacket of the central member 12.

In the embodiment depicted, the bundled cable 10 includes thirteen subunits 14. In embodiments, as few as a single subunit 14 can be provided around the central member 12. In general, the maximum number of subunits 14 that can be provided around the central member 12 is limited by the installation parameters (e.g., duct size) or manufacturing capabilities (e.g., winding equipment) for the bundled cable 10. For instance, given an installation parameter of a two inch duct size, the maximum number of subunits 14 that can be provided around the central member 12 may be thirty-nine subunits in embodiments. In still other embodiments, the subunits 14 are arranged in multiple layers around the central member 12. Taking the two inch duct again as an example, the bundled cable 10 may include an innermost layer of the seven subunits 14 around a jacketed GRP rod central member 12 with an intermediate layer of thirteen subunits 14 and an outer layer of another nineteen subunits 14 (7+13+19=39 subunits). In embodiments, the subunits 14 contain optical fibers and/or power transmission elements. Additionally, in embodiments, the subunits 14 may be "dummy cables" that do not contain any optical fibers or power transmission element but which provide structural support around the cable.

FIG. 2 depicts the structure of an embodiment of a bundled cable 10 in which the central member 12 is an optical fiber cable and the subunits 14 are drop cables. In the embodiment depicted, the central member 12 includes an outer jacket 16 having an inner surface 17 and an outer surface 18. In the embodiment depicted, the inner surface 17 defines a cable bore 19 within which a plurality of optical fibers 20 are disposed. The optical fibers 20 can be arranged in a variety of suitable ways within the central member 12. In the embodiment depicted, the optical fibers 20 are arranged in a stack 21 of multiple ribbons 22. In particular, the optical fibers 20 are arranged into a stack 21 of sixteen ribbons 22 having a plus-shaped cross-section. In the embodiment depicted, the total number of optical fibers 20 in the stack 21 of ribbons 22 is 288. In embodiments, a single stack can contain up to 864 optical fibers 20. As shown in FIG. 2, the stack 21 is surrounded by a stack wrap 24, which, in embodiments, may provide color coding for multiple-stack configurations (discussed below) and/or water-blocking properties. In embodiments, the central member 12 includes multiple stacks 21, e.g., from one stack to twelve stacks. Central members 12 of the type described are available from Corning Incorporated, Corning, N.Y., such as those marketed under the trademark RocketRibbon™. Alternatively, the optical fibers 20 may be arranged in a central tube (or a plurality of buffer tubes) in a loose tube configuration. Central members 12 of this type are available from Corning Incorporated, Corning, N.Y., such as those marketed under the trademarks ALTOS®, SST-Ribbon™, and SST-UltraRibbon™.

As can also be seen in the embodiment depicted in FIG. 2, the subunits 14 each include a plurality of optical fibers 20 disposed within a central tube 26. In embodiments, the subunits 14 contain from one optical fiber 20 up to thirty-six optical fibers 20 depending on the particular needs of the installation. In embodiments, the central tube 26 is surrounded by a plurality of tensile elements 28 (e.g., yarns of aramid, glass, and/or basalt fibers). The tensile elements 28 are surrounded by a subunit jacket 30. In embodiments, the subunit jacket 30 has an outer surface 32. A bond 34 is created between the outer surface 32 of the subunit jacket 30 and the outer surface 18 of the jacket 16 of the central member 12. In embodiments, the bond 34 is a thermally bonded interface created by a fusion of the jacket materials of the subunit jacket 30 and the central member jacket 16. In other embodiments, the bond 34 is created by application of a hot melt adhesive between the outer surface 32 of the subunit jacket 30 and the outer surface 18 of the central member jacket 16.

The subunits 14 are bonded to the central member 12 at various locations along a length of the central strength member. In embodiments, each subunit 14 is bonded to the central member 12 along substantially the entire length of the subunit 14. In other embodiments in which the subunits 14 are SZ stranded around the central member 12, the subunits 14 are bonded to the central member 12 at switchback locations (locations where the winding changes from S to Z or Z to S). In particular embodiments of SZ-stranded subunits 14, the subunits are bonded at each switchback location. In embodiments in which the subunits 14 are helically stranded around the central member 12, the subunits 14 are bonded to the central member 12 at drop locations (i.e., at locations where the path of the subunit 14 diverges from the central member 12).

According to a first embodiment, the bond 34 between the subunit 14 and the central member 12 is a fusion of the jacket material created by welding the subunit 14 to the central member 12. In a particular embodiment, the material of at least one of the subunit jacket 30 or the central member jacket 16 includes a metal element 35, such as metal particles, or a metal element 35, such as metal wire or mesh, is placed between the subunit jacket 30 and the central member jacket 16. In particular, the metal of the metal element 35 is selected to be magnetically susceptible, such as iron oxide particles or steel particles, wire, or mesh. In embodiments, the metal element 35 is applied discontinuously between the subunit 14 and the central member 12, e.g., at switchback points for SZ-stranded subunits 14 or at drop points for helically wound subunits 14. In particular embodiments, the weld bond 34 is created by inducing a current in the metal element 35 between the subunit 14 and the central member 12. The current heats up the metal element 35, which causes the material of the subunit jacket 30 and/or of the central member jacket 16 to melt and fuse together.

Figure 4:
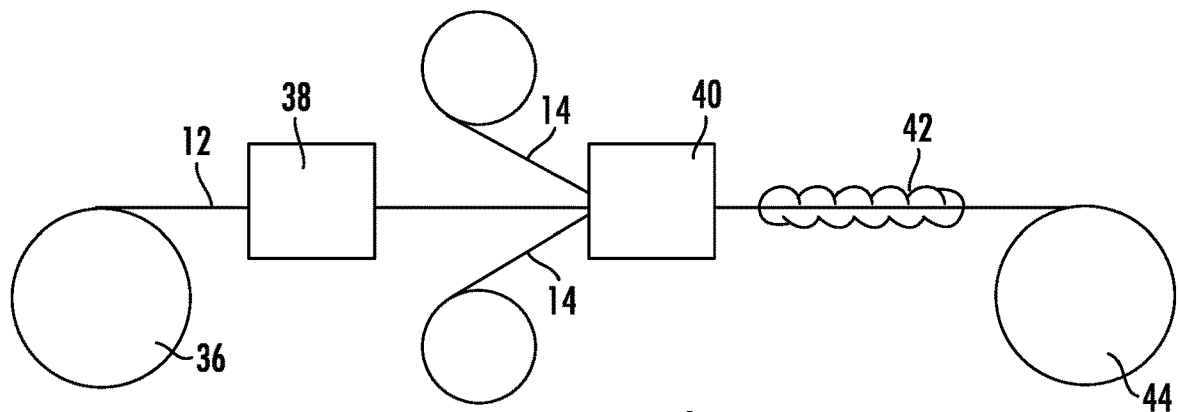
FIG. 4 provides a schematic representation of a processing line for bonding subunits to a central member, according to an exemplary embodiment.

FIG. 4 is a schematic depiction of a processing line for creating a bond 34 between the subunit jacket 14 and the central member 12. As shown in FIG. 4, the central member 12 is paid-off from a first reel 36. The central member 12 passes through a deposition chamber 38 where metal particles, wires, or mesh are applied to the central member 12. In another embodiment, the metal is impregnated in plastic material or tape applied to the central member 12. In embodiments, the plastic material is made from a polyethylene (PE), such as low density PE, linear low density PE, medium density PE, or high density PE; or polypropylene, among others. In embodiments, the tape is made from a material that can withstand the welding temperatures without melting and not interfere with the welding of the subunits 14 and the central member 12. Examples of such materials include, e.g., polyesters, such a polyethylene terephthalate (e.g., Mylar® available from Dupont Tejjin Films), polyimide films (e.g., Kapton® available from E. I. du Pont de Nemours and Company), and fiberglass, among others. In other embodiments, jacket material of the central member 12 and/or the subunits 14 may contain metal particles, such as by extruding strips of metal-containing polymer a various locations along the length of each subunit 14 and/or the central member 12.

Thereafter, the subunits 14 are stranded around the central member 12 at stranding unit 40 to create the bundled cable 10. In order to form the thermally bonded interface (i.e., bond 34), the cable bundle 10 is passed through an induction coil 42, heating up the metal element 35 in the subunit 14 and/or central member 12 to fuse the subunit jacket 30 to the central member jacket 16. In embodiments, the induction coil 42 is able to heat up the metal element 35 in less than ten seconds as the bundled cable 10 travels along the processing line. In such embodiments, the induction coil 42 only needs to be approximately six inches long. Advantageously, using the induction coil 42 to heat the metal element 35 without having to slow down or stop the cable processing line. Also, advantageously, the tension in the subunit 14 from the stranding processes provides sufficient force to join the jacket materials together without the need to apply any external forces. In other embodiments, subunits 14 and central member 12 can be bonded 34 via other methods, such as radio frequency welding, microwave welding, and ultrasonic welding, among others. In the embodiment depicted in FIG. 4, the bundled cable 10 is then taken up on a second reel 44 after the weld bond 34 is created.

In another embodiment, the bond 34 is created using a hot melt adhesive between the subunits 14 and the central member 12. With reference to FIG. 4, the central member 12 is paid-off from the first reel 36. The central member 12 passes through the deposition chamber 38 where hot melt adhesive is applied to the central member. In embodiments, the hot melt comprises at least one of a polyolefin/metallocene-based hot melt, ethylene-vinyl acetate-based hot melt, high polymer olefin-based hot melt, ethylene-acrylate-based hot melt, or polyethylene-based hot melt, among others. In an exemplary embodiment, the hot melt is BAMFutura 55 (available from Beardow Adams, Milton Keynes, England). After the hot melt is applied, the subunits 14 are stranded around the central member 12 before the hot melt solidifies. As with the weld described above, the tension in the subunit 14 from the stranding process provides sufficient force to bond the subunit 14 to the central member 12 without the need to apply any external forces. In embodiments, the hot melt may be impregnated with magnetically susceptible metal particles, and after stranding of the subunits 14, the bundled cable 10 may be passed through the induction coils 42 to reheat the hot melt and jacket materials to fuse the subunit 14 to the central member 12. Thereafter, the bundled cable 10 may be taken up on the second reel 44.

Figure 5:
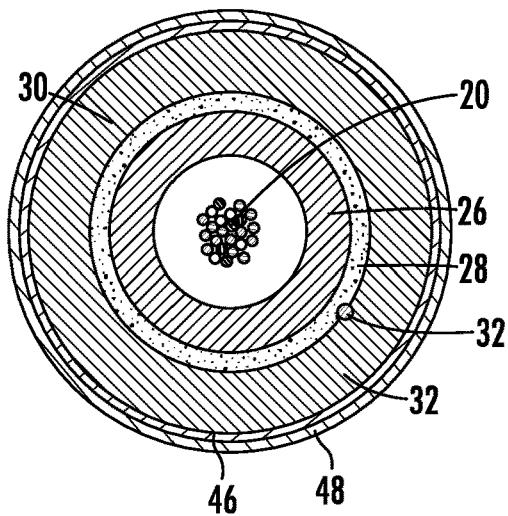
FIG. 5 depicts an embodiment of a drop cable having slip layers, according to an exemplary embodiment.

In still another embodiment, the subunits 14 and the central member 12 are each provided with an inner slip layer 46 and an outer slip layer 48 surrounding the subunit jacket 30 as shown in FIG. 5. The slip layers 46, 48 are relatively thin (e.g., <100 μm, particularly from 30 μm to 70 μm) as compared to the subunit jacket 30. In an embodiment, the outer slip layer 48 of the subunit 14 is selected to be compatible with the jacket 16 of the central member 12 so as to create a strong bond between the outer slip layer 46 and the central member jacket 16. Further, the inner slip layer 46 is selected to be incompatible with the outer slip layer 48. For example, in an embodiment, the outer slip layer 48 is selected to be polypropylene, and the inner slip layer is selected to by polyethylene. In this way, the slip layers 46, 48 are able to pull apart from each other so that subunits 14 can be separated from the central member 12 by hand during installation.

In another embodiment, a magnetically susceptible metal particle is coated with a polymer 50 and is provided between an inner subunit layer and an outer subunit layer on a bundled cable 10. The metal-impregnated polymer 50 is shaped like a ring or partial ring between the layers of subunits 14. The metal-impregnated polymer 50 is melted between the layers to bond the layers while still allowing the polymer between the layers to be broken to separate subunits from the bundled cable.

Figure 6:
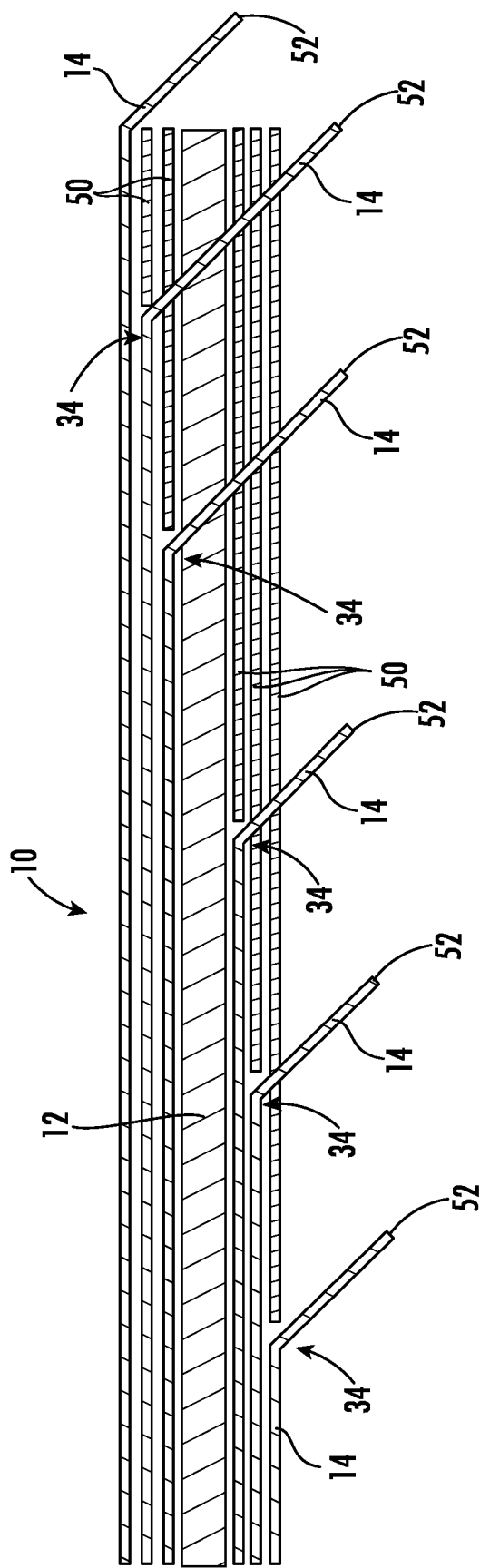
FIG. 6 depicts a schematic representation of a bundled optical fiber cable with drop cables diverging at drop points, according to an exemplary embodiment.

A schematic representation of a bundled cable 10 is depicted in FIG. 6. As can be seen, the central member 12 runs the length of the bundled cable 10. The subunits 14 each run along a portion of the length of the bundled cable 10 until each subunit 14 reaches its respective drop point. In embodiments in which the subunits 14 are helically wound around the central member 12, a bond 34, such as a weld or adhesive bond, is made between the subunits 14 and the central member 12. At the drop points, each subunit 14 is routed to a respective installation point. In embodiments, the remainder of the length of the bundled cable 10 may be backfilled with a power transmission cable 50, which not only allows for power to be routed along the cable but also maintains a constant diameter of the bundled cable 10. Further, in embodiments, the subunits 14 may each have connectorized ends 52.

Specifically, in embodiments, the ends 52 may be connectorized in the factory so that the bundled cable 10 can be deployed more easily, e.g., allowing "plug-and-play" installation. In embodiments, each drop cable 14 is pre-connectorized with, e.g, a multi-fiber push on (MPO) connector, such as an MTP® Connector, a mechanical transfer (MT) connector, such as an OptiTip® Connector, or a single-fiber connector, such as an OptiTap® connector (all available from Corning Incorporated, Corning, N.Y.). Further, in embodiments in which the central member 12 is an optical fiber cable, the optical fiber cable may be spliced into another bundled cable 10. For example, the optical fibers from the central member 12 may be spliced into subunits 14 of a downstream bundled cable 10 and/or into optical fibers of another optical fiber cable central member 12. In embodiments, the last bundled cable 10 in a chain of bundled cables 10 may have a central strength member as the central member 12.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of preparing a bundled cable, comprising:
    winding a plurality of subunits about a central member, wherein at least one of the plurality of subunits comprises a subunit jacket made of a first thermoplastic composition comprising a first outer surface and the central member comprises a central member jacket comprising a second thermoplastic composition with a second outer surface;
    providing a metal element at an interface of the second outer surface and the first outer surface of the at least one of the plurality of subunits; and
    heating the metal element such that at least one of the first thermoplastic composition or the second thermoplastic composition forms bonds with the other of the first thermoplastic composition or the second thermoplastic composition;
    wherein the step of heating comprises passing the at least one of the plurality of subunits and central member through inductive coils that heats at least one of the first thermoplastic composition or the second thermoplastic composition.

2. The method of claim 1, wherein the step of winding further comprises helically winding the plurality of subunits about the central member and wherein during the step of heating, the bonds are formed at drop points of the plurality of subunits.

3. The method of claim 1, wherein the step of winding further comprises SZ-stranding the plurality of subunits about the central member and wherein during the step of heating, the bonds are formed at switchback points of S-winding and Z-winding.

4. The method of claim 1, wherein the metal element comprises magnetically susceptible metal particles.

5. The method of claim 4, wherein at least one of the first thermoplastic composition or the second thermoplastic composition comprises the magnetically susceptible metal particles.

6. The method of claim 4, further comprising the step of applying a hot melt adhesive at the interface, wherein the hot melt adhesive comprises the magnetically susceptible metal particles.

7. The method of claim 1, wherein the metal element comprises a metal wire or a metal screen.

8. The method of claim 1, wherein the at least one of the plurality of subunits comprises at least one of optical fiber or at least one power transmission wire.

9. The method of claim 1, wherein central member comprises at least one of an optical fiber cable, a central strength member, or a power transmission cable.

10. The method of claim 1, wherein central member comprises at least one of an optical fiber cable, a central strength member, or a power transmission cable.

11. A method of preparing a bundled cable, comprising:
    winding a plurality of subunits about a central member, wherein at least one of the plurality of subunits comprises a subunit jacket made of a first thermoplastic composition comprising a first outer surface and the central member comprises a central member jacket comprising a second thermoplastic composition with a second outer surface;
    providing a metal element at an interface of the second outer surface and the first outer surface of the at least one of the plurality of subunits; and
    heating the metal element such that at least one of the first thermoplastic composition or the second thermoplastic composition forms bonds with the other of the first thermoplastic composition or the second thermoplastic composition, wherein the metal element comprises magnetically susceptible metal particles.

12. The method of claim 11, wherein the step of winding further comprises helically winding the plurality of subunits about the central member and wherein during the step of heating, the bonds are formed at drop points of the plurality of subunits.

13. The method of claim 11, wherein the step of winding further comprises SZ-stranding the plurality of subunits about the central member and wherein during the step of heating, the bonds are formed at switchback points of S-winding and Z-winding.

14. The method of claim 11, wherein at least one of the first thermoplastic composition or the second thermoplastic composition comprises the magnetically susceptible metal particles.

15. The method of claim 11, further comprising the step of applying a hot melt adhesive at the interface, wherein the hot melt adhesive comprises the magnetically susceptible metal particles.

16. The method of claim 11, wherein the step of heating comprises passing the at least one of the plurality of subunits and central member through inductive coils that heats at least one of the first thermoplastic composition or the second thermoplastic composition.

17. The method of claim 11, wherein the at least one of the plurality of subunits comprises at least one of optical fiber or at least one power transmission wire.

* * * * *